(12) United States Patent
Cheng

(10) Patent No.: US 12,409,611 B2
(45) Date of Patent: Sep. 9, 2025

(54) METHOD FOR PRODUCING GRINDING LIQUID MIXING TANK AND THE STRUCTURE THEREOF

(71) Applicant: Creative System Technology Ltd., Hsinchu (TW)

(72) Inventor: Huo Lung Cheng, Hsinchu (TW)

(73) Assignee: Creative System Technology Ltd., Hsinchu (TW)

( * ) Notice: Subject to any disclaimer, the term of this patent is extended or adjusted under 35 U.S.C. 154(b) by 111 days.

(21) Appl. No.: 18/539,361

(22) Filed: Dec. 14, 2023

(65) Prior Publication Data
US 2024/0239060 A1 Jul. 18, 2024

(30) Foreign Application Priority Data
Jan. 12, 2023 (TW) ................ 112101450

(51) Int. Cl.
| | |
|---|---|
| *B29C 65/42* | (2006.01) |
| *B29C 65/00* | (2006.01) |
| *B29C 65/18* | (2006.01) |
| *B29C 65/78* | (2006.01) |
| *B65D 3/06* | (2006.01) |
| *B65D 88/06* | (2006.01) |
| *B65D 88/26* | (2006.01) |
| *B65D 88/28* | (2006.01) |

(Continued)

(52) U.S. Cl.
CPC .............. *B29C 65/42* (2013.01); *B29C 65/18* (2013.01); *B29C 65/7808* (2013.01); *B29C 66/0242* (2013.01); *B29C 66/8145* (2013.01); *B65D 3/06* (2013.01); *B65D 88/06* (2013.01); *B65D 88/26* (2013.01); *B65D 88/28* (2013.01); *B01F 33/452* (2022.01); *B29L 2031/7154* (2013.01)

(58) Field of Classification Search
CPC ... B29L 2031/7154; B65D 3/06; B65D 88/06; B65D 88/26; B65D 88/28
See application file for complete search history.

(56) References Cited

U.S. PATENT DOCUMENTS

| | | | | |
|---|---|---|---|---|
| 5,556,497 A | * | 9/1996 | Murphy | B29C 66/73116 156/304.6 |
| 8,640,910 B2 | * | 2/2014 | Novak | F17C 1/16 220/582 |
| 9,377,162 B2 | * | 6/2016 | Sejima | B29C 45/0046 |

(Continued)

FOREIGN PATENT DOCUMENTS

| | | | | |
|---|---|---|---|---|
| CA | 2552717 C | * | 11/2011 | ............ B01F 23/233 |
| JP | S63252535 A | * | 10/1988 | .......... B01F 13/0845 |

*Primary Examiner* — Benjamin A Schiffman

(57) ABSTRACT

A method for producing a grinding liquid mixing tank and the structure thereof, the method includes: using a tank body made of PP or PVDF wherein a bottom thereof has a conical arc-shaped wall having at least one wall hole; using a rotor case made of PP or PVDF and including a bottom case wall, a side wall surrounding the bottom case wall, and a connecting wall connected to a top edge of the side wall; heating to soften the rotor case and placing it into the wall hole; using a jig to contact the rotor case, such that the connecting wall is deformed to be coupled to the wall hole; welding a joint between the connecting wall and the wall hole to form the tank body; and a magnetic levitation stirrer is then installed in the tank body to complete the structure of the grinding liquid mixing tank.

4 Claims, 10 Drawing Sheets

(51) Int. Cl.
  *B01F 33/452* (2022.01)
  *B29L 31/00* (2006.01)

(56) References Cited

U.S. PATENT DOCUMENTS

| | | | |
|---|---|---|---|
| 11,155,020 B2* | 10/2021 | Kato | B29C 53/34 |
| 11,174,990 B2* | 11/2021 | Otsubo | F17C 1/16 |
| 11,459,169 B2* | 10/2022 | Kato | B65D 90/08 |
| 2016/0257403 A1* | 9/2016 | Masuda | B65D 1/16 |
| 2019/0170300 A1* | 6/2019 | Cola | F17C 13/00 |
| 2023/0405534 A1* | 12/2023 | Cheng | B01F 35/187 |

* cited by examiner

METHOD FOR PRODUCING GRINDING LIQUID MIXING TANK AND THE STRUCTURE THEREOF

CROSS-REFERENCE TO RELATED APPLICATIONS

This application claims the priority of Taiwan patent application Ser. No. 112101450, filed on Jan. 12, 2023, which is incorporated herewith by reference.

BACKGROUND OF THE INVENTION

The present invention relates to the technical field of grinding liquid mixing tanks, and in particular to a tank body structure completed by installing an open magnetic levitation stirrer.

The present invention has recently designed a stirring and mixing method of a grinding liquid mixing tank. The method involves installing an inclined magnetic levitation stirrer inside the tank body to obtain a good mixing effect. Although it is easier to process if the tank body is made of metal, however, the grinding liquid of the present invention is mainly used in semiconductor manufacturing process. In order to prevent the chemical agents in the tank from reacting with the material of the tank wall and then causing the material to be dissolved into the liquid, the tank body is generally made of polypropylene (PP) or polyvinylidene difluoride (PVDF). If it is intended to install a magnetic levitation stirrer therein, a rotor case must be further installed to load the rotor. Since the bottom of the tank body in this design has a conical arc-shaped wall tapering from top to bottom, the rotor case must be formed with a conical surface corresponding to the conical arc-shaped wall and the joint must be very flat, which increase the difficulty in manufacturing. In addition, the thickness of the rotor case cannot be too thick, so as not to affect the magnetic force and cause the rotor to be unable to be levitated and rotate. For this reason, the present invention provides a method for producing a grinding liquid mixing tank and the structure thereof.

SUMMARY OF THE INVENTION

A main object of the present invention is to provide a method for producing a grinding liquid mixing tank and the structure thereof, in which a rotor case having multiple sections of walls with different thickness is used, and a solder is preheated and softened to perform weld-fixing, so as to achieve a good joint effect between the rotor case and the tank body. Finally, a grinding liquid mixing tank that meets the requirements is completed, so that a good mixing and stirring effect for the grinding liquid can be obtained in the tank body and the generation of the shear stress can be reduced.

In order to achieve the above objects, the present invention adopts the following technical solution:

The present invention provides a method for producing a grinding liquid mixing tank, comprising the following steps: providing a tank body made of polypropylene (PP) or polyvinylidene difluoride (PVDF), wherein a bottom of the tank body has a conical arc-shaped wall, and the arc-shaped wall has at least one wall hole; providing a rotor case made of polypropylene (PP) or polyvinylidene difluoride (PVDF), wherein the rotor case includes a bottom case wall, a side wall surrounding the bottom case wall, and a connecting wall connected to a top edge of the side wall, wherein the side wall has a thickness smaller than a thickness of the bottom case wall and a thickness of the connecting wall; heating to soften the rotor case, and placing the rotor case into the wall hole; providing a jig to contact the rotor case, such that the connecting wall is deformed to be coupled to the wall hole; welding a joint between the connecting wall and the wall hole with a solder.

As one of the preferred embodiment, the connecting wall has a protruding ring at an outermost edge thereof, the protruding ring constitutes a thickest region of the connecting wall.

As one of the preferred embodiment, wherein the jig is located inside the tank body and contacted with the rotor case and the conical arc-shaped wall, and then the joint between the connecting wall and the rotor case is welded from outside of the tank body with the solder.

As one of the preferred embodiment, wherein the jig comprises a calibrating arc-shaped wall and a protruding portion, the calibrating arc-shaped wall corresponds to a conical surface of the conical arc-shaped wall, and when the jig is in contact with the rotor case, the connecting wall can be slightly deformed to have an arc-shaped surface by the calibrating arc-shaped wall and correspond to an arc-shaped surface of the conical arc-shaped wall, and the protruding portion is located in a space enclosed by the bottom case wall and the side wall.

The present invention also provides a structure of a grinding liquid mixing tank, comprising: a tank body which is a container made of polypropylene (PP) or polyvinylidene difluoride (PVDF), a bottom of the tank body has a conical arc-shaped wall, the conical arc-shaped wall is combined with a rotor case, the rotor case is made of polypropylene (PP) or polyvinylidene difluoride (PVDF), the rotor case comprises a bottom case wall, a side wall surrounding the bottom case wall, and a connecting wall connected to a top edge of the side wall, the side wall has a thickness smaller than a thickness of the bottom case wall and a thickness of the connecting wall, and is combined with the conical arc-shaped wall through the connecting wall; a magnetic levitation stirrer comprising a driving stator and a magnetic levitation rotor, the driving stator covers the rotor case, the magnetic levitation rotor is located inside the rotor case, the driving stator can drive the magnetic levitation rotor to rotate with the rotor case being therebetween, such that a blade on the magnetic levitation rotor disturbs a grinding liquid in the tank body.

Compared with the prior art, the present invention provides a structure of a grinding liquid mixing tank, comprising a tank body and a magnetic levitation stirrer disposed at the bottom of the tank body in an inclined manner. The bottom of the tank body has a conical arc-shaped wall, the conical arc-shaped wall is combined with a rotor case. The tank body and the rotor case are both made of polypropylene (PP) or polyvinylidene difluoride (PVDF), which meet the requirement that the grinding liquid container must be made of specific materials. The grinding liquid mixing tank constructed in this manner reduces the shear stress during operation, thereby avoiding condensation of coarse particles, so as to smoothly outputs high-quality grinding liquid with uniform and fine slurry particles.

DETAILED DESCRIPTION OF THE INVENTION

Figure 1:
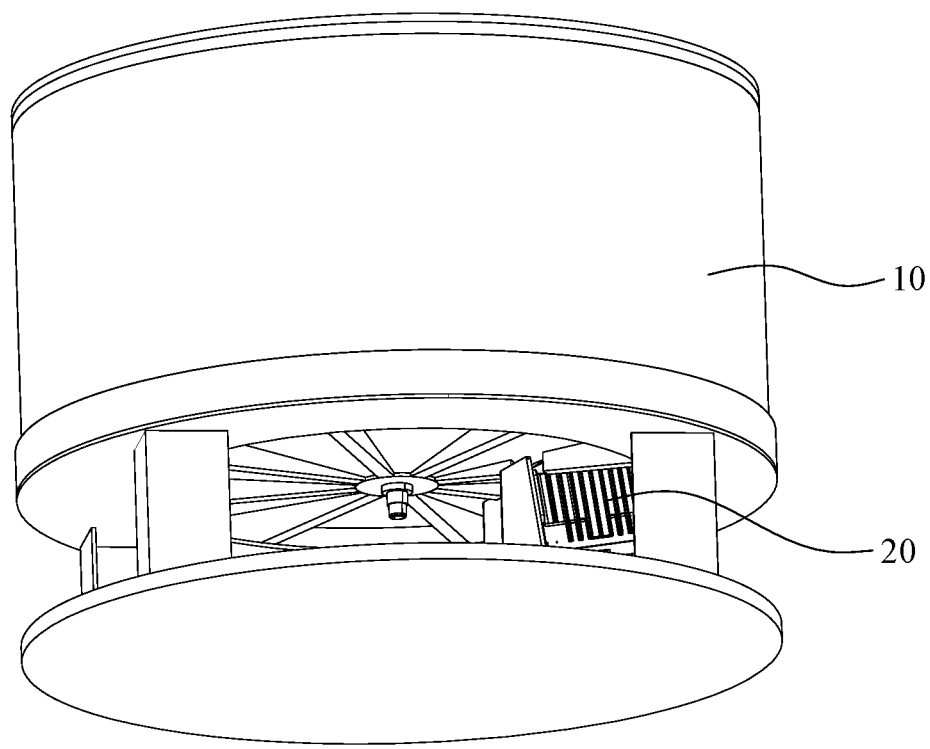
FIG. 1 is a perspective view of the present invention.

The technical solution of the present invention will be clearly and completely described below with reference to specific embodiments and drawings. It should be noted that when a component is described as being "mounted or fixed to" another component, which means that it can be directly located on the another component, or intervening component(s) may also be present in therebetween. When a component is described as being "connected to" another component, which means that it can be directly connected to the another component, or intervening component(s) may also be present in therebetween. In the illustrated embodiment, direction expressions such as up, down, left, right, front and back are relative, and are used to explain that the structure and movement of different components of the present invention are relative. These expressions are appropriate when the components are at the position shown in the drawings. However, if the description of the positions of these components changes, it is considered that these expressions will change accordingly.

Unless otherwise defined, all technical and scientific terms used herein have the same meanings as commonly understood by those skilled in the art of the present invention. The terms used herein are merely for the purpose of describing specific embodiments, and are not intended to limit the present invention. The term "and/or" used herein includes any and all combinations of one or more associated listed items.

Figure 2:
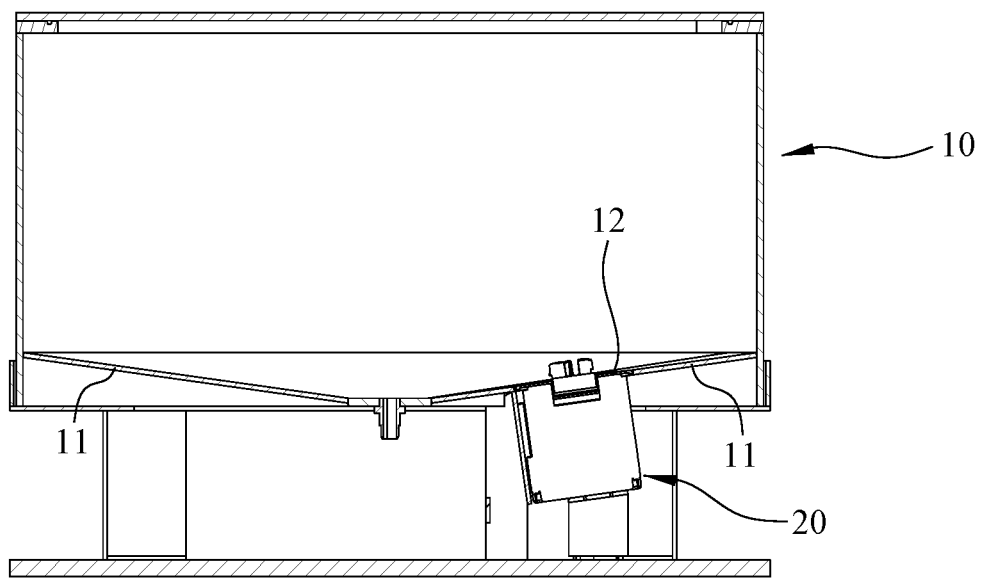
FIG. 2 is a longitudinal section view of the present invention.

Refer to FIGS. 1 and 2, which are a perspective view and a longitudinal section view of the present invention, respectively. A grinding liquid mixing tank of the present invention has a structure including a tank body 10 and a magnetic levitation stirrer 20 disposed in an inclined manner.

Figure 3:
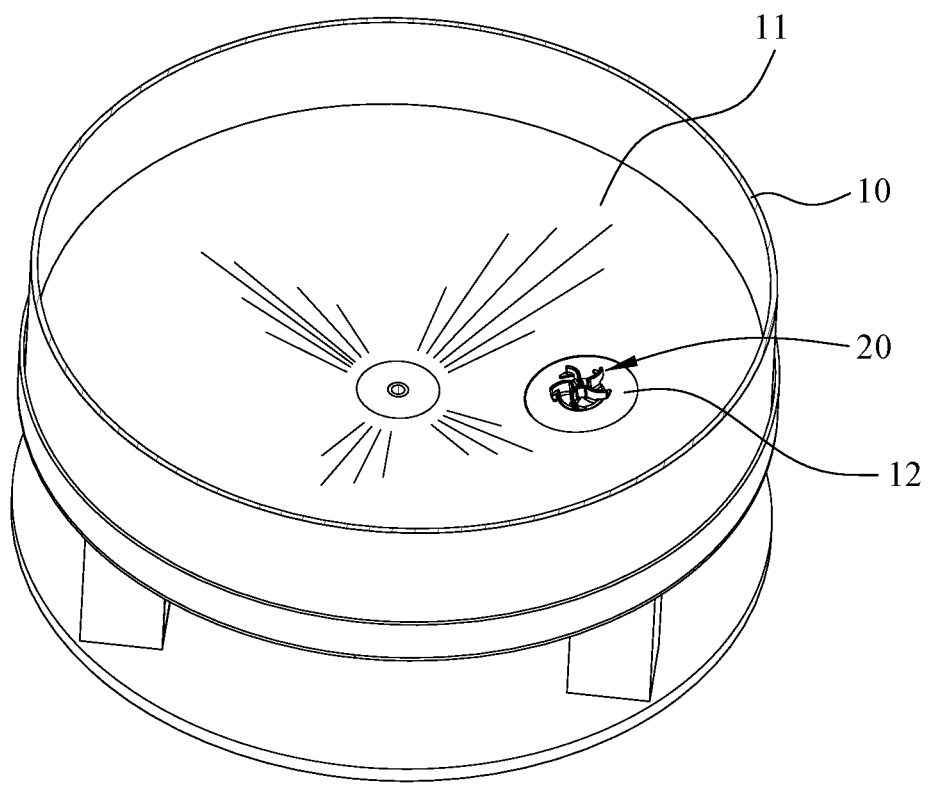
FIG. 3 is a partial schematic diagram of inside of a tank body of the present invention.
Figure 4:
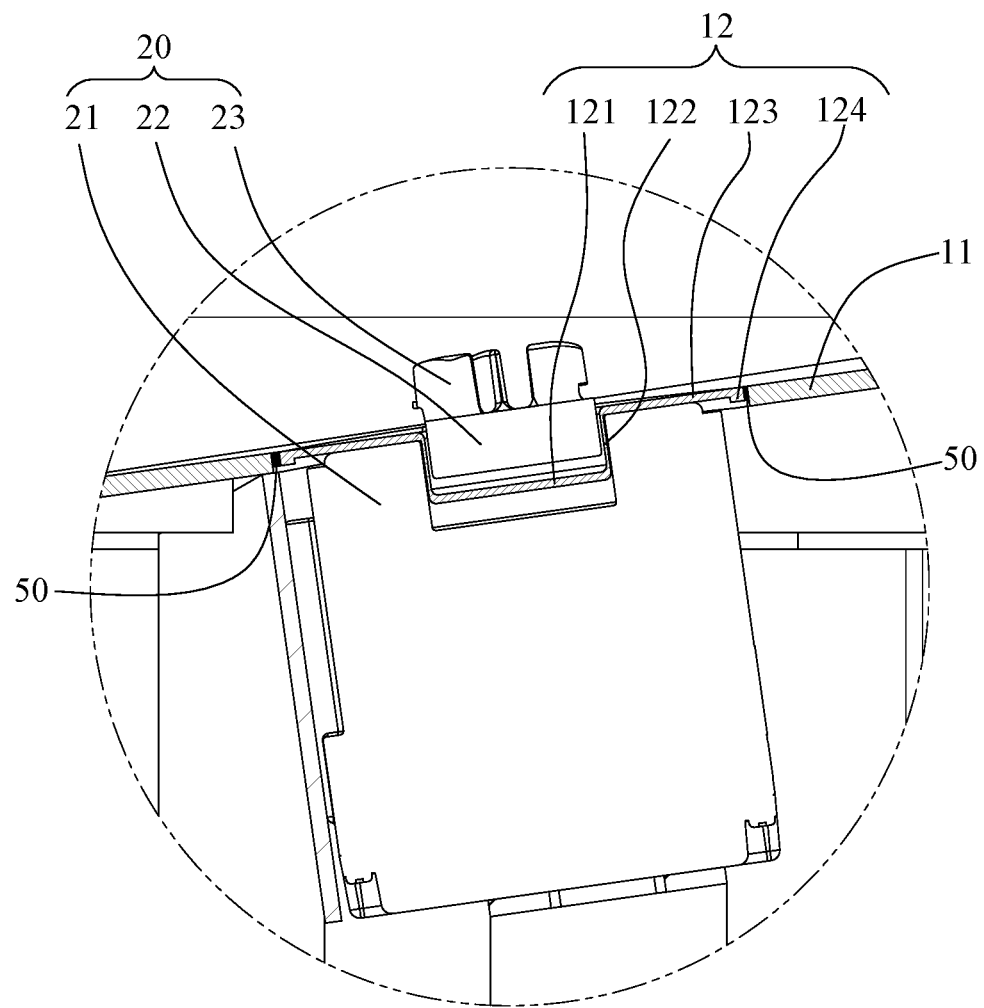
FIG. 4 is a partial enlarged section view of the present invention.

Also referring to FIGS. 3 and 4, the tank body 10 is a container made of polypropylene (PP) or polyvinylidene difluoride (PVDF), the bottom of the tank body 10 has a conical arc-shaped wall 11. The conical arc-shaped wall 11 is combined with a rotor case 12. The rotor case 12 is also made of polypropylene (PP) or polyvinylidene difluoride (PVDF). The rotor case 12 comprises a bottom case wall 121, a side wall 122 surrounding the bottom case wall 121, and a connecting wall 123 connected to a top edge of the side wall 122. The edge of the connecting wall 123 is connected to and combined with the conical arc-shaped wall 11. In the present invention, the connecting wall 123 and the conical arc-shaped wall 11 are combined together by solder welding, wherein a solder 50, which is also made of polypropylene (PP) or polyvinylidene difluoride (PVDF), is applied. The solder 50 is softened by heating to weld the joint between the connecting wall 123 and the conical arc-shaped wall 11. In order not to interfere the operation of the magnetic levitation stirrer 20, the rotor case 12 of the present invention has some special designs, that is, respective walls have different thickness, wherein the side wall 122 has a thickness smaller than a thickness of the bottom case wall 121 and a thickness of the connecting wall 123, preferably, the thickness of the bottom case wall 121 is also smaller than the thickness of the connecting wall 123. In addition, the connecting wall 123 can also be provided with a protruding ring 124 at the outermost edge thereof. The protruding ring 124 constitutes a thickest region of the connecting wall 123. In this way, the joint between protruding ring 124 and the conical arc-shaped wall 11 is welded with the solder, which can increase the bonding strength between the connecting wall 123 and the conical arc-shaped wall 11.

The magnetic levitation stirrer 20 comprises a driving stator 21 and a magnetic levitation rotor 22 (which is schematically shown in the figure only, but not shown with section line). The driving stator 21 covers the outer periphery of the rotor case 12. The magnetic levitation rotor 22 is located inside the rotor case 12. The driving stator 21 has an electromagnetic coil that can generate magnetic force. The magnetic levitation rotor 22 comprises one or more permanent magnets therein, which allow(s) the magnetic levitation rotor 22 to be levitated by magnetic force and rotate during the operation of the driving stator 21. The structures of the driving stator 21 and the magnetic levitation rotor 22 are similar to those in the conventional art, so that will not be described in detail below. When the magnetic levitation rotor 22 rotates, a blade 23 on the magnetic levitation rotor 22 will disturb the grinding liquid in the tank body 10. Since the conical arc-shaped wall 11 is in a conical shape, the magnetic levitation stirrer 20 can be disposed at the bottom of the tank body 10 in an inclined manner. When the blade 23 is further used for stirring and rotation, the shear stress applied to the grinding liquid is reduced and the quality of the grinding liquid is maintained. In addition, the connecting wall 123 of the rotor case 12 can have an outer diameter greater than an outer diameter of the driving stator 21, so as to facilitate welding and assembly.

Figure 5:
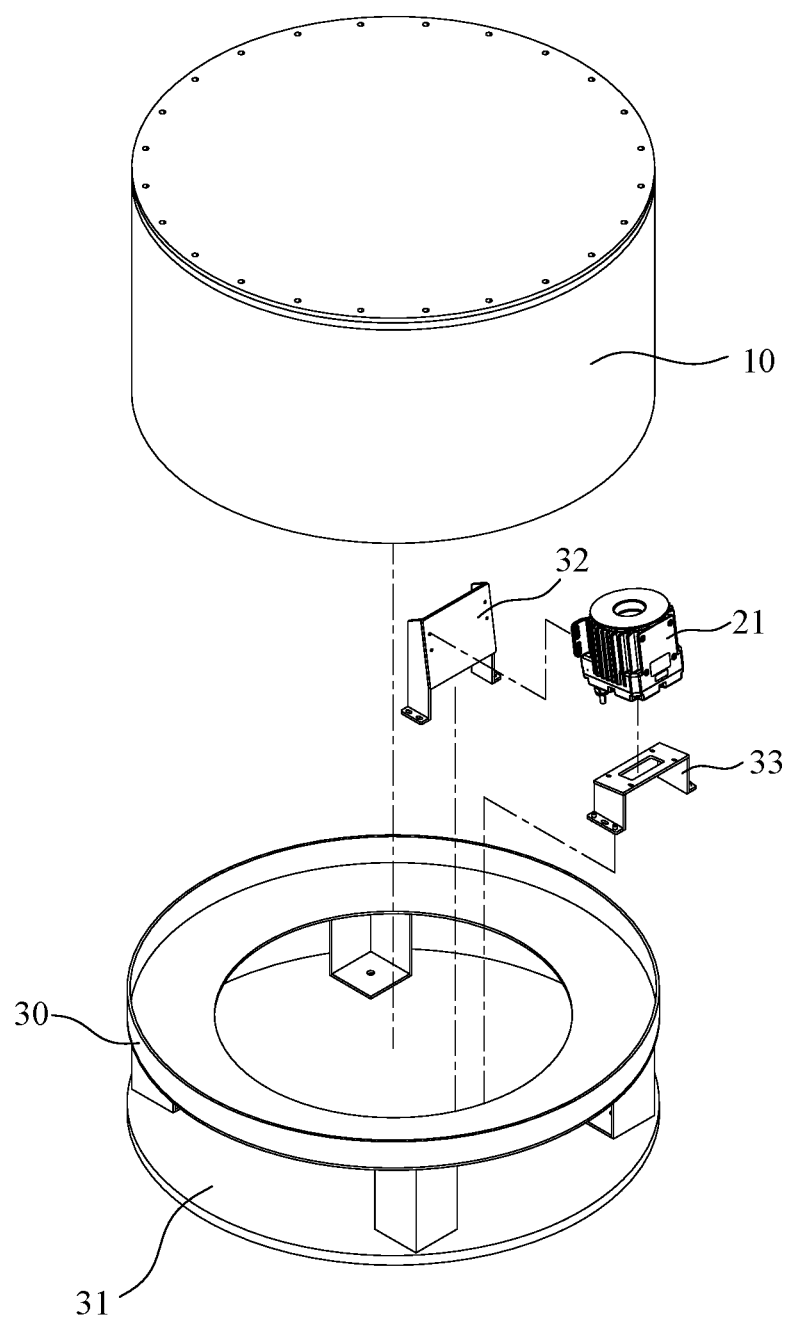
FIG. 5 is a partial exploded view of the present invention.

As shown in FIG. 5, in order to ensure that the magnetic levitation stirrer 20 can be installed at the correct position, the tank body 10 of the present invention is firstly installed on a support frame 30. The support frame 30 has a base plate 31, and a vertical support bracket 32 and a horizontal support bracket 33 provided on the base plate 31. The vertical support bracket 32 and the horizontal support bracket 33 fix the side wall and the bottom wall of the driving stator 21, respectively, so as to accurately control the relative position between the driving stator 21 and the conical arc-shaped wall 11.

Figure 6:
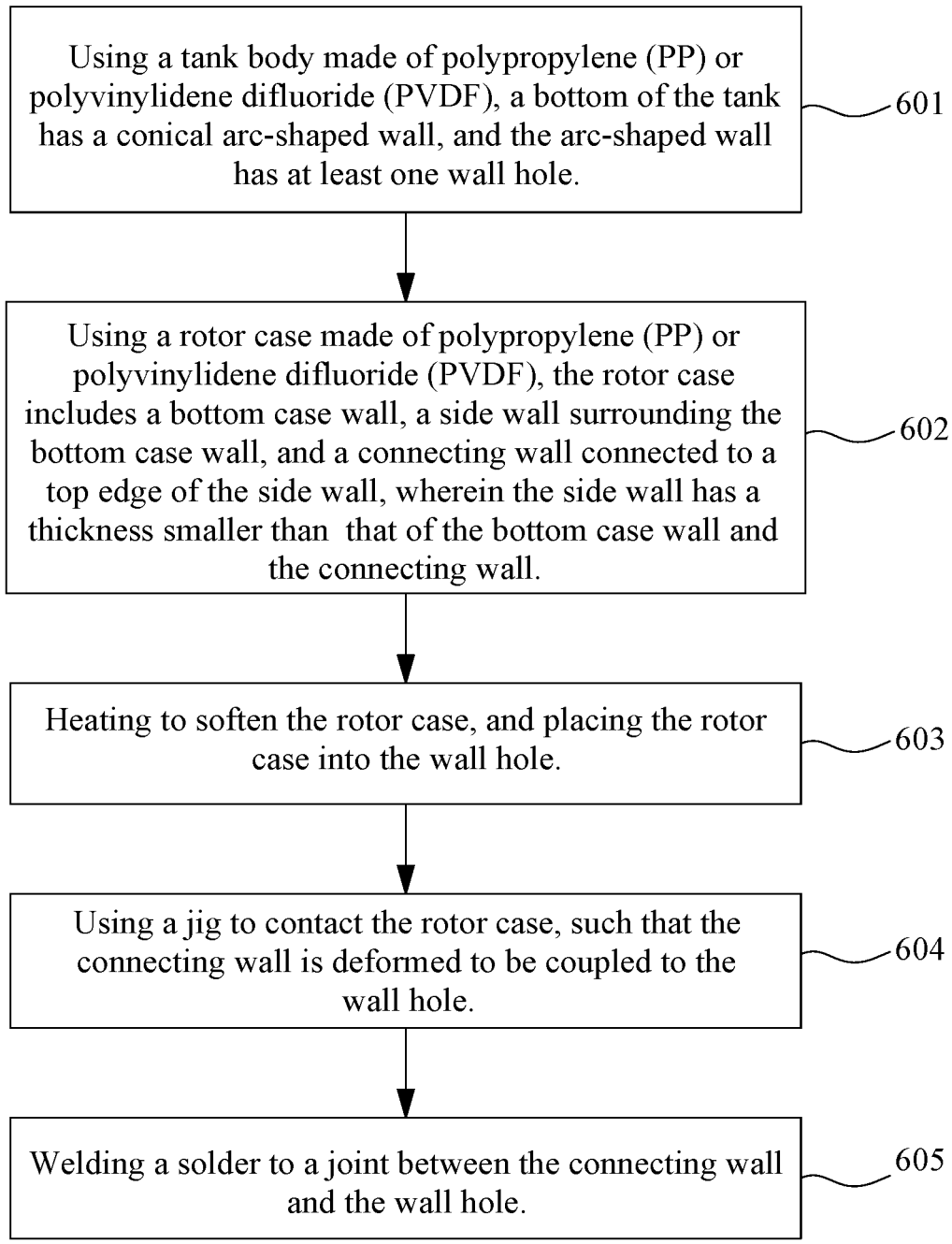
FIG. 6 is a flow chart of a producing method of the present invention.
Figure 7:
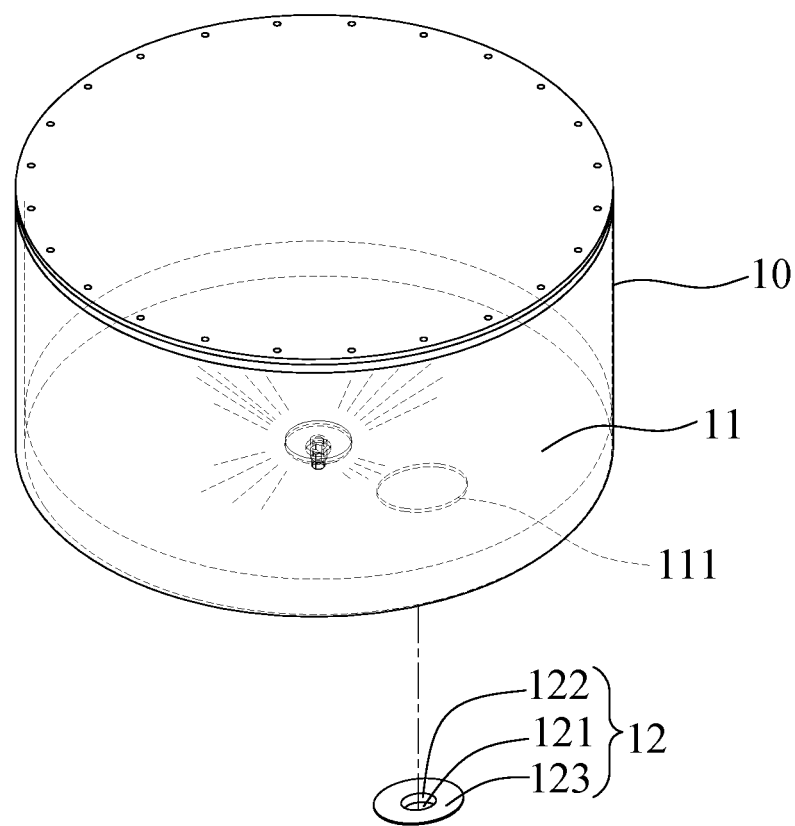
FIG. 7 is an exploded schematic diagram of the tank body and a rotor case in the producing method of the present invention.

Since the bottom of the tank body 10 of the present invention has a conical arc-shaped wall 11, in order to make the rotor case 12 more closely fit the arc shape of the conical arc-shaped wall 11, the present invention adopts a method for producing a grinding liquid mixing tank. Refer to FIG. 6, which is a flow chart of the present invention, and FIGS. 7 to 10, which are schematic diagrams of the operation of the present invention. The producing method comprises the following steps:

Step 601: providing a tank body made of polypropylene (PP) or polyvinylidene difluoride (PVDF), a bottom of the tank body has a conical arc-shaped wall, and the arc-shaped wall has at least one wall hole; as shown in FIG. 7, the bottom of the tank body 10 has a conical arc-shaped wall 11 tapering from top to bottom, the conical arc-shaped wall 11 is formed with a hole defined by wall hole 111.

Step 602: providing a rotor case made of polypropylene (PP) or polyvinylidene difluoride (PVDF), the rotor case includes a bottom case wall, a side wall surrounding the bottom case wall, and a connecting wall connected to a top edge of the side wall, wherein the side wall has a thickness smaller than a thickness of the bottom case wall and a thickness of the connecting wall; as shown in FIG. 7, the rotor case 12 comprises a bottom case wall 121, a side wall 122, and a connecting wall 123, the connecting wall 123 has an outer diameter smaller than a diameter of the hole defined by the wall hole 111.

Figure 8:
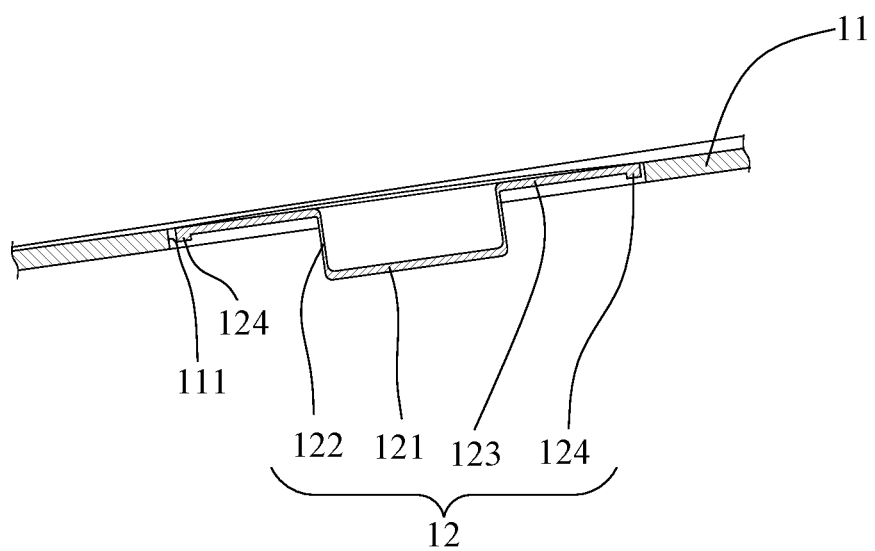
FIG. 8 is a schematic diagram illustrating the rotor case placed in a wall hole of a conical arc-shaped wall in the producing method of the present invention.

Step 603: heating to soften the rotor case, and placing the rotor case into the wall hole; as shown in FIG. 8, the softened rotor case 12 is placed into the hole defined by the wall hole 111, and the connecting wall 123 is connected to the inner edge of the wall hole 111 of the conical arc-shaped wall 11.

Figure 9:
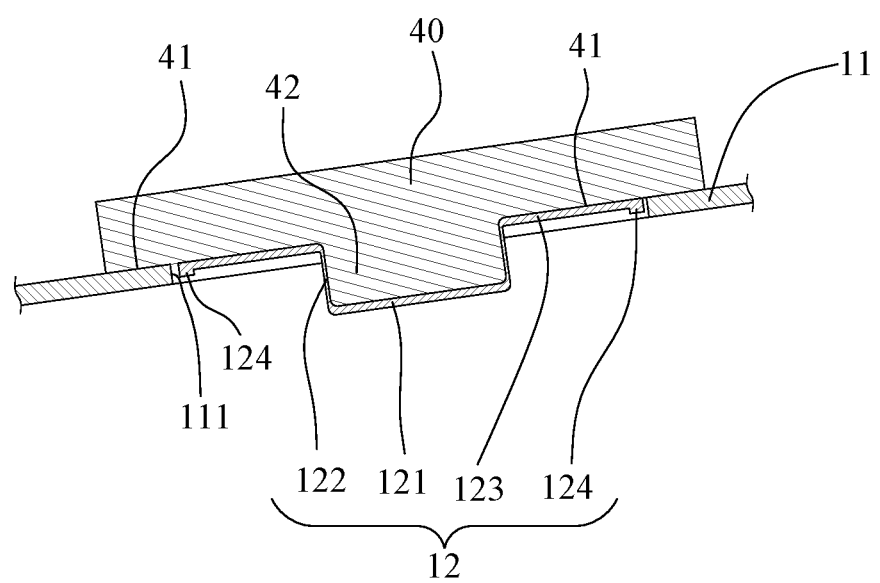
FIG. 9 is a schematic diagram of a jig used in the producing method of the present invention.

Step 604: providing a jig to contact the rotor case, such that the connecting wall is deformed to be coupled to the wall hole; as shown in FIG. 9, a jig 40, which comprises a calibrating arc-shaped wall 41 and a protruding portion 42, is applied. The calibrating arc-shaped wall 41 corresponds to a conical surface of the conical arc-shaped wall 11. When the jig 40 is in contact with the rotor case 12, the connecting wall 123 can be slightly deformed to have an arc-shaped surface and connected to the arc-shaped surface of the conical arc-shaped wall 11, and the protruding portion 42 is located in the space enclosed by the bottom case wall 121 and the side wall 122, so as to further prevent this portion from being deformed.

Figure 10:
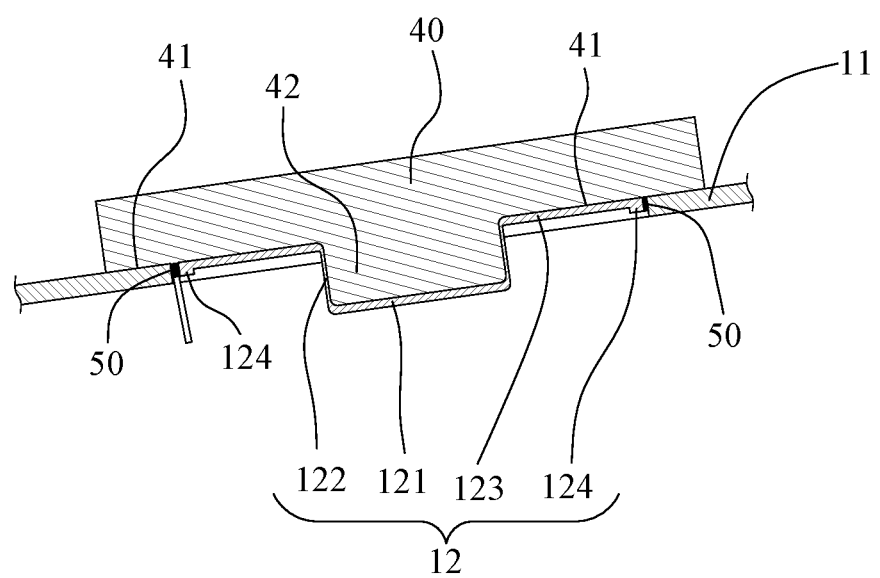
FIG. 10 is a schematic diagram illustrating welding with a solder in the producing method of the present invention.

Step 605: welding a joint between the connecting wall and the wall hole with a solder; as shown in FIG. 10, the solder 50 is heated then used to weld and fill the gap between the connecting wall 123 and the wall hole 111. Since in this embodiment, the protruding ring 124 with a greater thickness can be further provided, thereby an increased contact area can be obtained between the protruding ring 124 and the connecting wall 11, making both of them to be more firmly fixed. In addition, because the jig 40 is located on the inner surface of the tank body 10, the connecting portion is flatter and meets the requirements.

After the above operations are completed, a basic structure of a grinding liquid mixing tank is formed, and then the magnetic levitation stirrer 20 is installed in the tank body 10. For example, the driving stator 21 covers the bottom of the rotor case 12, in which during the process of installing the support frame 30 at the tank body 10, by fixing the driving stator 21 to the support frame 30 through the vertical support bracket 32 and the horizontal support bracket 33, the position of the driving stator 21 can be accurately fixed; while the magnetic levitation rotor 22 is placed in the rotor case 12 through the tank body 10.

In summary, the present invention provides a structure of a grinding liquid mixing tank, comprising a tank body 10 and a magnetic levitation stirrer 20 disposed at the bottom of the tank body 10 in an inclined manner. The bottom of the tank body 10 has a conical arc-shaped wall 11. The conical arc-shaped wall 11 is combined with a rotor case 12. The tank body 10 and the rotor case 12 are both made of polypropylene (PP) or polyvinylidene difluoride (PVDF), which meet the requirement that the grinding liquid container must be made of specific materials. The grinding liquid mixing tank constructed in this manner reduces the shear stress during operation, thereby avoiding condensation of coarse particles, so as to smoothly outputs high-quality grinding liquid with uniform and fine slurry particles.

Those described above are only preferred embodiments of the present invention, but not intended to limit the scope of the embodiments of the present invention. That is, all equivalent changes and modifications made in accordance with the claims of the present application are covered by the claimed scope of the present application.

The invention claimed is:

1. A method for producing a grinding liquid mixing tank, comprising the following steps:
    providing a tank body made of polypropylene (PP) or polyvinylidene difluoride (PVDF), a bottom of the tank body having a conical arc-shaped wall, and the arc-shaped wall having at least one wall hole;
    providing a rotor case made of polypropylene (PP) or polyvinylidene difluoride (PVDF), the rotor case including a bottom case wall, a side wall surrounding the bottom case wall, and a connecting wall connected to a top edge of the side wall, wherein the side wall has a thickness smaller than a thickness of the bottom case wall and a thickness of the connecting wall;
    heating to soften the rotor case, and placing the rotor case into the at least one wall hole;
    providing a jig to contact the rotor case, such that the connecting wall is deformed to be coupled to the at least one wall hole; and
    welding a joint between the connecting wall and the at least one wall hole with a solder.

2. The method of claim 1, wherein the connecting wall has a protruding ring at an outermost edge thereof, and the protruding ring constitutes a thickest region of the connecting wall.

3. The method of claim 1, wherein the jig is located inside the tank body and contacted with the rotor case and the conical arc-shaped wall, and then the joint between the connecting wall and the rotor case is welded from outside of the tank body with the solder.

4. The method of claim 1, wherein the jig comprises a calibrating arc-shaped wall and a protruding portion, the calibrating arc-shaped wall corresponds to a conical surface of the conical arc-shaped wall, and when the jig is in contact with the rotor case, the connecting wall can be slightly deformed to have an arc-shaped surface by the calibrating arc-shaped wall and correspond to an arc-shaped surface of the conical arc-shaped wall, and the protruding portion is located in a space enclosed by the bottom case wall and the side wall.

* * * * *